Patented June 15, 1937

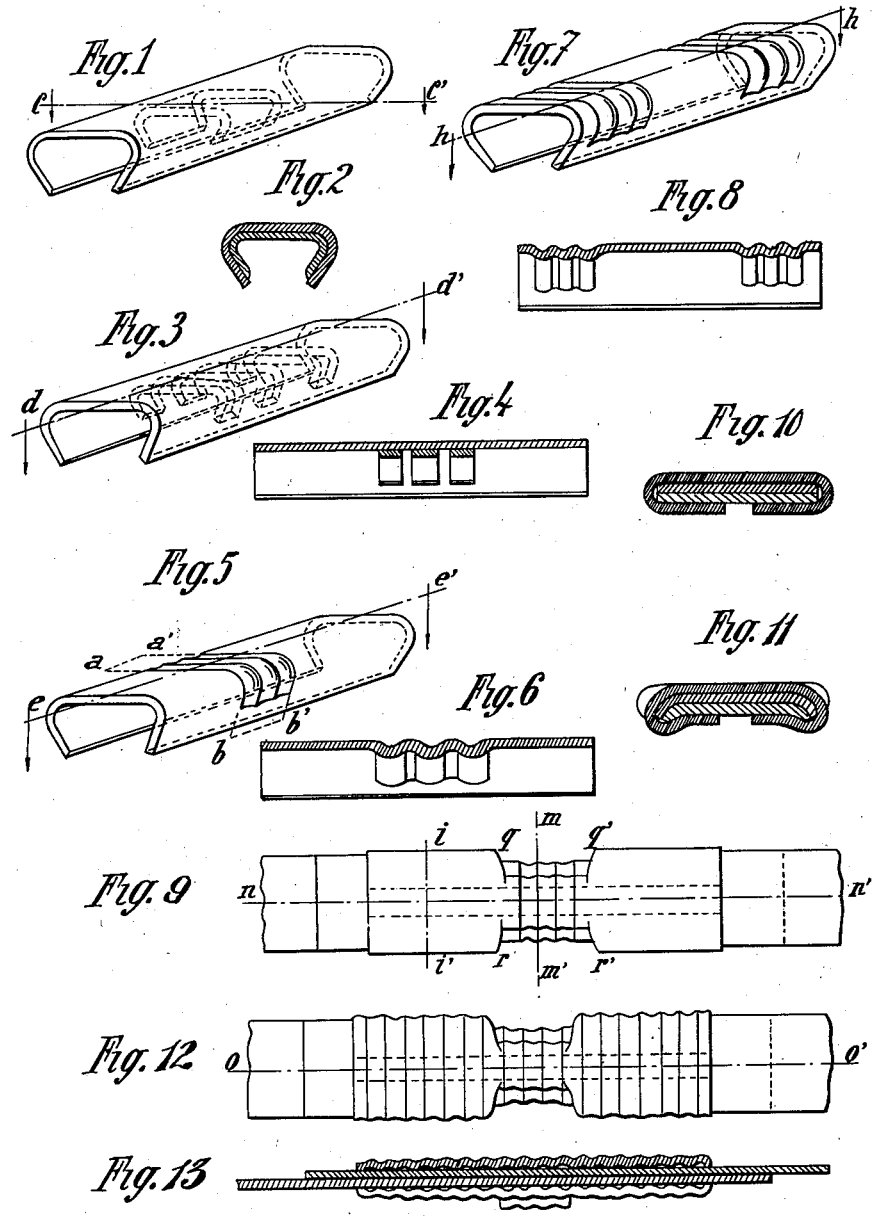

2,084,063

UNITED STATES PATENT OFFICE 2,084,063

METAL SEAL FOR CONNECTING THE ENDS OF A METAL BAND BINDING A PACKAGE

André Rebichon and Séraphin Sicard, Paris, France

Application March 11, 1935, Serial No. 10,573
In France March 10, 1934

3 Claims. (Cl. 24—23)

(Granted under the provisions of sec. 14, act of March 2, 1927; 357 O. G. 5)

Known seals used for connecting the ends of a metal band binding a packing-case are constituted by a sleeve made of a metal of uniform thickness.

When made of very thin metal, these seals easily close over the ends of the band, but, in order to ensure a firm junction, side notches must be made in the seal and band, so that the bond is not held sufficiently tight.

When the seals are made of thick metal, they are more firmly held in position, but it is very difficult to distort them on the ends of the band with the hand tools employed without shearing the sleeve and band.

For eliminating these inconveniences, it has been proposed to use seals provided with various pressed portions in which must enter, by equal distortions, the side or upper portions of the metal band.

In this case, the seal is not perfectly held in position, as the waved portions of the metal do not exactly coincide or register with the angular distortions of the seal owing to the resiliency of the metal.

The seal forming the subject-matter of the present invention eliminates these inconveniences and is perfectly and firmly held in position without having to exert any abnormal effort.

The said seal is characterized by the fact that it is constituted by one or more small metal sleeves fitted in a larger sleeve in which they are held by simple pressure, or by welding, or, preferably, said small sleeves form a part of the large sleeve, either by unequal rolling of the metal used, or by the use of pressed parts secured in position and replacing on the surrounding sleeve the small metal sleeves.

The new function provided being not to receive equal distortions of the bond, as the seal would not hold with sufficient firmness, but to act as very thick metal, resulting in the following advantages: nearly total eliminations of the resiliency of the sleeve upon application of the seal,—ease of closing the seal over the band,—perfect fastening of the seal. The location, arrangement and shape of these pressed parts provided on the large sleeve can vary without departing thereby from the scope of the invention, said pressed parts acting however as thick metal, but with greater efficiency on the edges of the seal and forming a supplementary vice assisting the action of the seal carrying the pressed parts.

The accompanying drawing illustrates some forms of construction of the seal forming the subject-matter of the present invention.

In this drawing:

Fig. 1 shows a seal in the middle portion of which a metal sleeve has been secured by welding.

Fig. 2 is a section made according to line c—c' of Fig. 1.

Fig. 3 illustrates a seal in which small metal bars have been secured by welding.

Fig. 4 is a section made according to line d—d' of Fig. 3.

Fig. 5 shows a seal in which the small metal bars of Fig. 3 have been replaced by pressed parts.

Fig. 6 is a section made according to line c—c' of Fig. 5.

Fig. 7 illustrates a seal in which the pressed parts replacing the small solid bars are located on either side of the seal.

Fig. 8 is a section made according to line h—h' of Fig. 7.

Fig. 9 shows the seal of Fig. 5 locked on two ends of a metal band.

Fig. 10 is a section made according to line i—i' of Fig. 10.

Fig. 11 is a section made according to line m—m' of Fig. 10.

Fig. 12 shows a seal locked on two ends of a metal band and in which pressed parts arranged throughout the length act as small welded bars.

Fig. 13 is a section made according to line o—o' of Fig. 12.

The seals illustrated in the above figures can be in the shape of a slightly closed U as shown in the drawing, or in the shape of an open U, or again in the shape of a U closed over two thicknesses of metal band.

The seal will be secured on the metal band in the following manner, by taking as example the seal shown open in Fig. 5 and illustrated as being closed in Fig. 9 by a sealing block acting on a sole member:

A V-shaped blade having a width $qq'$ greater than the width $rr'$ of the present parts and having a flat inner sliding surface has shaped, on the lower sole member of the apparatus, the portion necessary for allowing the seal to be perfectly held in position.

The side angles of the distortion formed on thin metal have been obtained without effort, and, for holding the seal, the two tongues of the metal band confined by the ribs slightly flattened by the pressure, allow the seal to be perfectly held in position owing to the fact that they are firmly, rigidly and undistortably confined between said ribs.

Laterally, the two portions of the seal which are pressed in, are folded so as to form V-shaped inclines acting at the same time as the distorting blade.

The seal illustrated in Figs. 7 and 8 would be secured in position in the same manner, but with two distorting blades.

The invention provides a modification for securing the same seal on the metal band.

In this case, the V-shaped member adapted to form the distorted portion, acts on either side of the portion of the seal carrying the pressed parts and does not straddle the latter.

The effort required can be compared to that necessary for closing a thin fork-piece, but a better result is obtained as regards the holding of the seal, as the pressed parts surrounding the band very firmly press upon the latter under the action of the pressure exerted by the tool which thus eliminates the resiliency of the metal; the side angles of the striated portion exactly break along the edges of the metal thus forming a strong vice which, becoming undistortable since it is greatly reinforced, will not allow the distortions obtained on the band on either side on the flat portion of the seal to pass and to slide.

Finally, a modification illustrated in Figs. 12 and 13 combines on one and the same seal the operations effected according to the method above described and according to the first method described with reference to Fig. 5.

The seal carrying pressed parts throughout its length confines, on the one hand, the distorted tongues and, on the other hand, the edges of the metal are clamped between the pressed parts of the seal.

It is to be noted that the tools effecting these operations do not shape the metal according to the shape of the pressed parts carried by the seal, but utilize these pressed parts as solid vices secured in the seal with however advantages.

We claim:

1. A metal sleeve for sealing strap joints, comprising a piece of sheet metal bent in U-shape so as to present a middle part, two lateral parts and bent portions connecting said lateral parts to said middle part, and reinforcing elements extending transversely from said middle part across said bent portions on to said lateral parts.

2. A metal sleeve for sealing strap joints, comprising a piece of sheet metal bent in U-shape so as to present a middle part, two lateral parts and bent portions connecting said lateral parts to said middle part, and transverse serrations formed in said piece of sheet metal and extending from said middle part across said bent portions onto said lateral parts.

3. A metal sleeve for sealing strap joints, comprising a piece of sheet metal bent in U-shape so as to present a middle part, two lateral parts and bent portions connecting said lateral parts to said middle part, and transverse serrations formed in said sheet metal and extending completely across said middle part, bent portions and lateral parts.

ANDRÉ REBICHON.
SÉRAPHIN SICARD.